Patented June 24, 1930

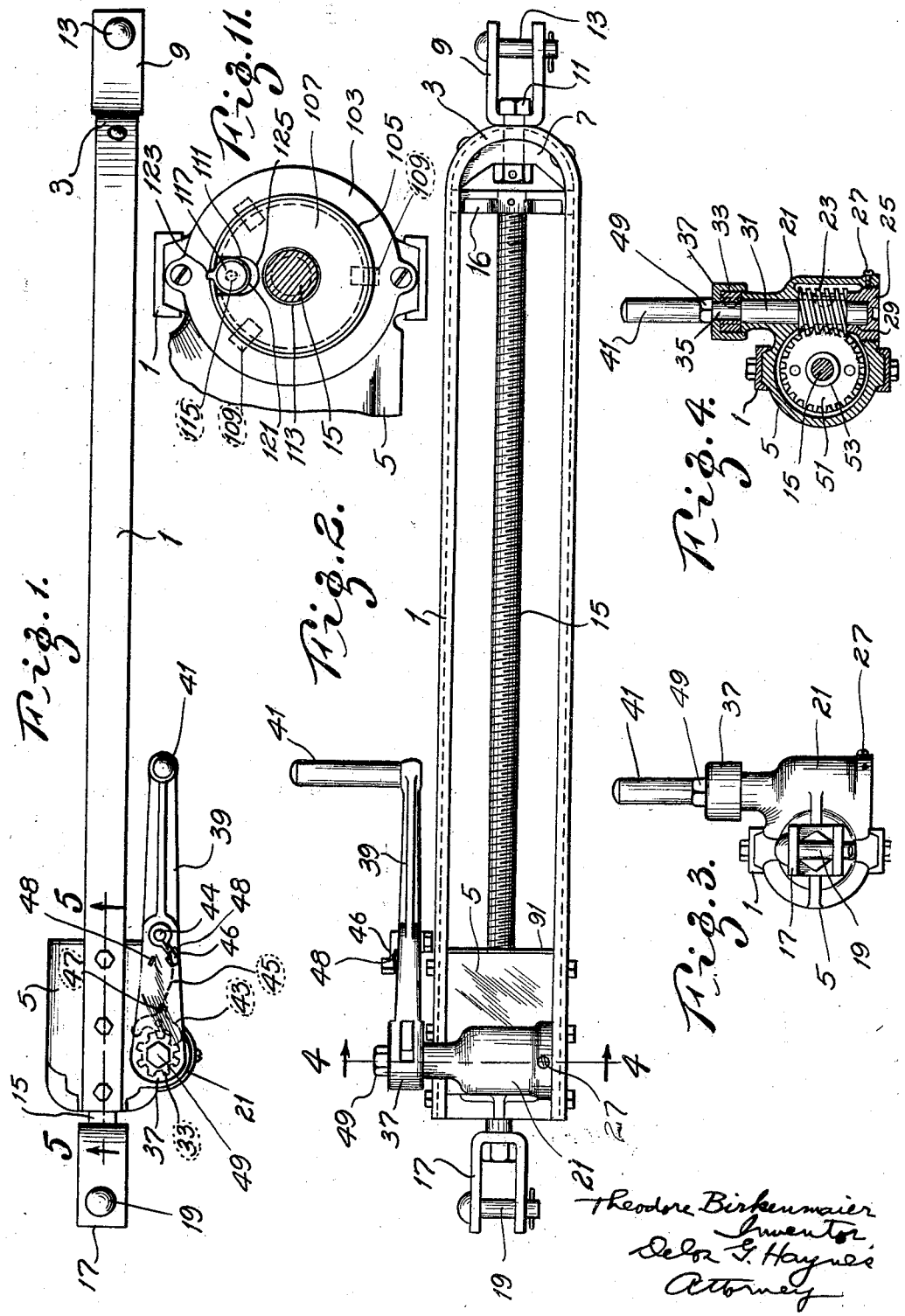

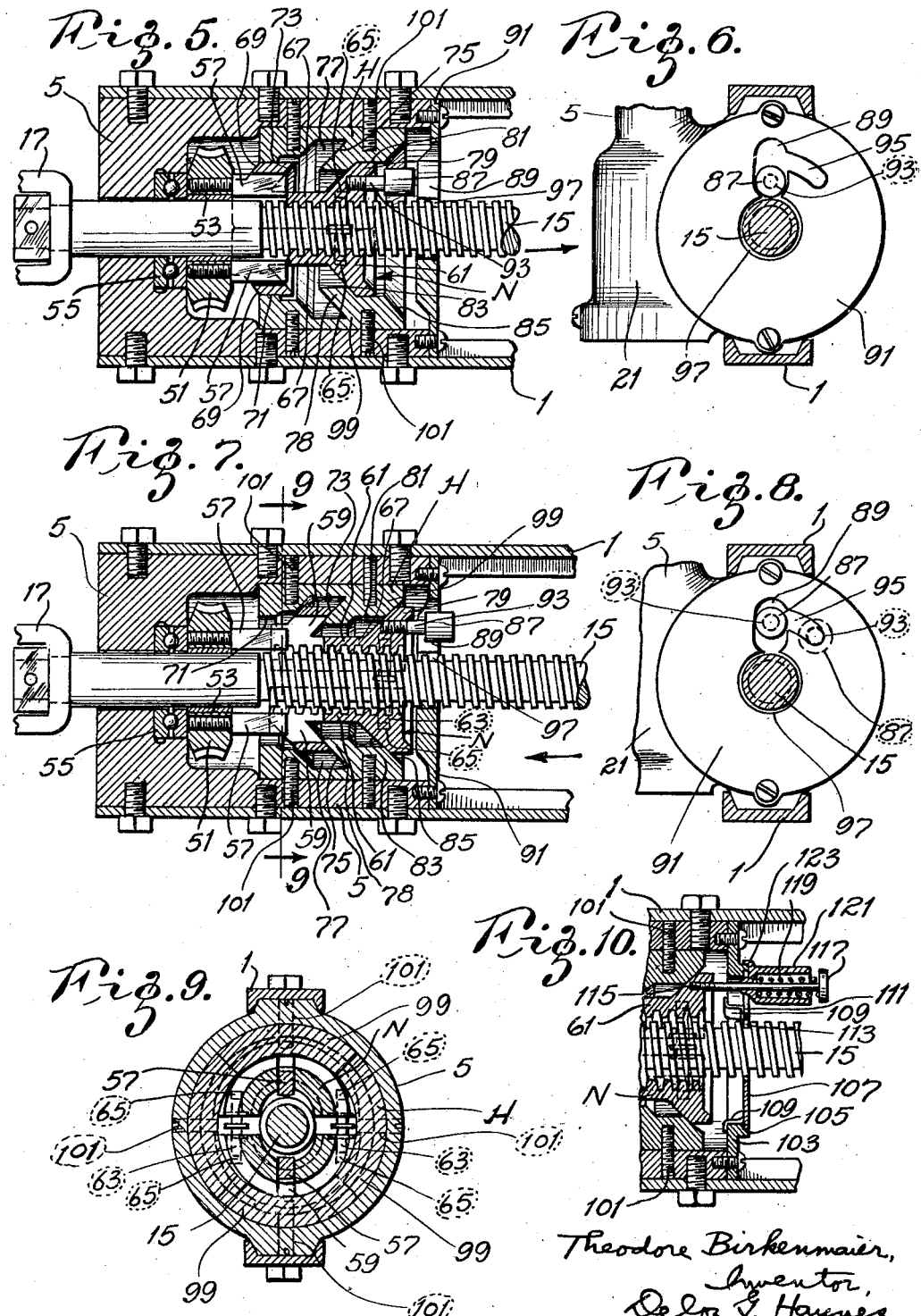

1,765,397

UNITED STATES PATENT OFFICE

THEODORE BIRKENMAIER, OF ST. LOUIS, MISSOURI, ASSIGNOR TO W. N. MATTHEWS CORPORATION, OF ST. LOUIS, MISSOURI, A CORPORATION OF MISSOURI

SLACK PULLER

Application filed September 13, 1926. Serial No. 135,112.

This invention relates to slack pullers, and with regard to certain more specific features to a slack puller for wire, cable and similar strands.

Among the several objects of the invention may be noted the provision of an improved slack puller which employs certain split nut features of the class used in a co-pending application of Walter A. Heinrich, Serial No. 106,286, filed May 3, 1926, but which introduces an improved means for holding the nut closed, said means to be independent of the driving force; a slack puller of the class described employing a minimum number of parts; and one which can consequently be built more ruggedly and is simpler in operation. Other objects will be in part obvious and in part pointed out hereinafter.

The invention accordingly comprises the elements and combination of elements, features of construction, and arrangements of parts which will be exemplified in the structure hereinafter described, and the scope of the application of which will be indicated in the following claims.

In the accompanying drawings, in which are illustrated two of various possible embodiments of the invention, Fig. 1 is a side elevation of the slack puller;

Fig. 2 is a front elevation thereof;

Fig. 3 is a left end view of Fig. 2;

Fig. 4 is a section taken on line 4—4 of Fig. 2 and shows a worm wheel drive;

Fig. 5 is an enlarged lateral section taken on line 5—5 of Fig. 1 and shows a split nut in closed position;

Fig. 6 is a right end view of Fig. 5;

Fig. 7 is a view similar to Fig. 5 and shows the split nut in a partially open position;

Fig. 8 is a right end view of Fig. 7;

Fig. 9 is a cross section taken on line 9—9 of Fig. 7 but shows a slightly greater opening of a split nut;

Fig. 10 is a fragmentary view similar to Fig. 7 but shows a modified form with the split nut in open position; and Fig. 11 is a right end view of Fig. 10.

Referring now more particularly to Fig. 1, there is illustrated at numeral 1 a channel iron or like frame bent to an arc of one hundred and eighty degrees at a section 3 thereof. The section 3 is located substantially midway between the two ends of the channel 1. The two ends of said channel 1 are bolted to a housing casting 5. The mid-section 3 of the channel 1 has a boss or brace member 7 riveted thereto for the purpose of carrying a swiveled clevis 9. The clevis 9 is held by means of a conventional nut-and-bolt combination 11 and carries a coupling pin 13 for purposes of fastening it to cable ends and the like. The brace member 7 is formed to engage completely the one hundred and eighty degrees of an arc of the section 3, for purposes of positively preventing inward collapse of the members under end strains.

Longitudinally located with respect to the channel 1 is provided a take-up or draw screw 15 having an acme or like type of thread cut thereon. Any suitable type of thread of proper strength may be used. The screw 15 passes through the casting 5 and parts associated therewith (to be described) and emerges at the lower end of the device. It is provided at its outside or lower end with a preferably non-swiveling clevis 17, which carries a coupling pin 19 for the purpose of fastening to another end of the cable to be stretched. The other end of the screw 15 has a cross-head 16 pinned thereto which slidably engages the grooves of the sides of the channeled frame 1. The screw 15 can not rotate but it may move longitudinally.

The casting 5 carries a reducing gear and a split nut driven thereby, adapted to engage and disengage the said screw 15.

Referring now more particularly to Figs. 2, 3 and 4, there is shown a sidewardly extending portion 21 of the casting 5, formed integrally therewith. The portion 21 is cored out to receive a worm gear 23 and a thrust bearing 25 therefor. The bearing is screwed home and acts as a cap. It is held in a predetermined position by means of a locking screw 27 (see Fig. 4). The bearing 25 also has a supporting portion or socket 29 for rotatably supporting a shaft 31, to which the worm 23 is keyed. This shaft 31 passes outwardly from the portion 21 and is there provided with a ratchet wheel 33 fastened tightly thereto. Rotatably borne on a stub end 35 of the shaft 31, and on the end of the portion 21, is a ratchet housing 37 of a crank arm 39. The crank arm 39 is provided with a conventional hand grip 41 (Figs. 1 and 2). Within the housing 37 is pivoted a pawl 43. The pawl 43 is provided with two oppositely ratcheting lugs either one of which may engage the teeth of the ratchet 33. A spring 45 reacts from a pivot shaft 44 in the housing 37 opposite to the pivot of the pawl, against said pawl at a point near and above the pivot thereof. This point near and above the pivot is provided with a lug 47 adapted to pinch and hold the spring 45 in position on the pawl. The spring is of the flat leaf type. It is evident that if the spring 45 be initially in a state of strain, the pawl 43 will tend to be over-centered either one way or the other, depending upon the initial lateral curvature manually given to the spring 45. This initial curvature is given to the spring by setting a handle 46 on the shaft 44 over center one way or another. The movement of this handle 46 is resisted in part by frictionally engaging with lugs 48. By the above described means the worm gear 23 may be rotated in either direction, that is, it may be ratcheted in either direction by setting the handle 46. A nut 49 prevents the crank 39 from being inadvertently removed endwardly.

The gear 23 meshes with a worm wheel 51 which has a bronze bushing 53 fitted thereto adapted to permit rotation of the worm wheel with respect to, and around the screw member 15 (Figs. 5 to 8). The worm wheel 51 is adapted to normally react against an end thrust bearing 55 supported in the casting 5. It has screwed thereto a pair of oppositely disposed split nut keys 57, each one of which cooperates with a key way 59 cut endwise into respective halves 61 of a split nut N.

The split nut N comprises the said halves 61, which are internally threaded to fit the screw 15, that is, when said halves are drawn together as shown in Fig. 5. In this position the two halves of the split nut fit together circularly. Slidable dowel pins 63 supported in recesses 65 in the two halves of the split nut N serve to hold said halves in alignment in respect to their relative positions along the length of the screw 15. The purpose of this will appear hereinafter.

The split nut N, as illustrated in Figs. 5 and 7, is split along a horizontal plane and comprises a body portion 67 having an undercut sloping shoulder 69 the outer peripheral and cylindrical surface of which (when the split nut is closed, Fig. 5) slidably cooperates with a corresponding cylindrical wall 71 formed through a split nut housing H. An undercut conical surface 73 of the shoulders 69 is adapted to cooperate with another conical surface 75 forming part of a recess 77. This cooperation takes place when the split nut is drawn to the right (Fig. 7). The recess 77 is cut into a split nut housing H. The conical surfaces 73 and 75 are in effect camming surfaces.

The split nut is provided rearwardly with another shoulder 79, the outside peripheral surface of which is adapted to slidably cooperate with a second wall 81 in the housing H. A conical surface 83 of said shoulder 79 is adapted (when the split nut is expanded) to cooperate with a conical surface 85 cut inwardly in said housing H.

Extending from the shoulder 79 is a thumb nut 87. This thumb nut 87 slidably fits a radial slot 89 in a cam plate 91 when the split nut N is positioned to the right as shown in Fig. 7. When said nut is positioned farther to the right than shown in Fig. 7 the stem 93 of said thumb nut 87 is adapted to cooperate with a circular slot 95 forming an extension of said wider slot 89. The cam plate 91 is screwed down to the casting 5 and is provided with a passage 97 which permits free slidable movement of the non-rotatable screw 15. Positioning of the nut 87 with respect to the slots 89, 95, may normally be regulated manually by a finger pressure at said nut, that is, when said nut can be reached.

As illustrated in Fig. 9 the split nut housing H is made up of a suitable plurality of segments 99 which are held to the casting 5 by set screws 101. By thus constructing the housing H in segments, the assembly of the device is facilitated. It is to be understood that it is not absolutely necessary that the segmental pieces 99 be fashioned as a complete circle. They may be separated substantial distances. The axes of the dowel pins 63 are positioned at right angles to the parting surface of the split nut N.

The operation of the slack puller is as follows, assuming the split nut to be closed on the screw 15:

The crank 39 is turned until the split nut N is rotated to such a position that the thumb nut 87 is opposite the slot 89. The screw 15 is then pushed inwardly with respect to the frame 1 (to the right, Fig. 5), whereby the undercut conical surface 73 of the split nut N is caused to cooperate with the conical surface 75 of the split nut housing H. This results in relative movement of the nut N with respect to the keys 57 and with respect to the housing H and also results in opening of the split nut N. The conical surfaces 83 and 85 are aligned when the conical surfaces 73 and 75 cooperate. The split nut shoulder 69 cooperates with the recess 77. In effect, the split nut N is wedged apart and opened by an extension 78 on the split nut housing H.

The above operation puts the device into its Fig. 9 position in which the threads on the draw screw 15 and the threads of the split nut N are just separated. If it is desired to positively hold the threads in separated position the thumb nut 87 may be pushed outwardly along the radial slot 89 and then pushed to the side with the stem 93 in the circular slot 95 (see dotted lines in Fig. 8). By this means the threads of the nut and screw are separated a somewhat greater distance than shown in Figs. 7 and 9 and they are positively held apart. The threaded member 15 may now be moved to any longitudinal position with respect to the frame 1, whereby the slack puller may have its reach adjusted.

The device is put into operation by properly fastening cable lengths at the clevises 9 and 17. The draw screw 15 is then pushed into the frame 1 manually for such a distance as will take up most or all loose slack. After this the thumb nut 87 is rotated into the slot 89 and pushed toward the center of the cam plate 91. This means that the split nut N is cammed shut toward the left (Fig. 7) by the recess 77 in the nut housing H. By slightly playing the draw screw 15 a point will be reached at which the split nut threads engage the draw screw threads. Under conditions of full engagements between these threads the thumb screw 87 is positioned entirely below the surface of the cam plate 91 and the shoulders 69 and 79 are rotatably held within their respective walls 71 and 81. The two halves of the split nut N move together longitudinally because of the aligning action of the dowel pins 63 in their recesses 65.

The crank 39 may now be rotated whereby the worm gear 23 operates the worm wheel 51 to drive the keys 57. The keys 57 drive the split nut N, and since said split nut is cooperating with the draw screw 15, said draw screw is caused to feed inwardly with respect to the frame 1. This draws up the slack in the cable and the reaction of the nut N is taken by the worm wheel 51 which in turn transmits the reaction to the thrust bearing 55.

One of the advantages of the present invention is that the direct thrust from the crank 39 is not used for holding the split nut in a closed position. This nut is held in said closed position because of the positioning of the shoulders 69 and 79 in the walls 71 and 81 respectively, yet the nut can rotate freely. The walls 71 and 81 provide a large bearing surface around the split nut, as it rotates.

After the proper tension has been put into a cable and it has been fastened, the slack puller may again be opened by moving the crank 39 until the thumb screw 87 is aligned with said slot 89. This may be done after having reversed the ratchet and having slacked off somewhat to remove the slack puller from the cable. Then by pushing the draw screw inwardly with respect to the frame 1, the split nut N will be automatically opened as hereinbefore described.

In so far as the device is not to be used as a compression member, no bearing is required on the right side of the worm wheel 51. The inherent curvature of the teeth of said wheel prevents spontaneous separation thereof from the worm 23. It is to be understood that proper clearances are left between the various conical surfaces, to provide for proper movements of the pieces, despite the fact that two conical surfaces will not engage longitudinally as a closed sliding pair. These surfaces engage as kinematic open pairs.

If after pulling up slack with this device, it is desired to again let it out, this may easily be done merely by reversing the ratchet and reversing the movement of the crank 39.

In Figs. 10 and 11 is shown a modified form of thumb nut arrangement wherein the necessity is eliminated for aligning said nut with a slot before the split nut N can be moved to the right.

In this construction the plate 91 is replaced by an open ring 103 which is provided with a counter bored lip 105 adapted to rotatably support a free running disc 107. The disc is held in place on the lip by slidable engaging fingers 109. It is provided with a radially cut slot 111 and a suitable opening 113 permitting free passage of the screw 15.

Screwed into the split nut N is a stem 115 having a head 117 which is reacted against and has joined thereto a spring 119. This spring 119 tends normally to push a recessed thumb lug 121 to the left on said stem 115. The lug 121 is provided with a spur 123 adapted to hook over the lip 105 when the thumb piece 121 is pulled to the right and twisted to its Figs. 10 and 11 positions. In this position the split nut is open, and if it is rotated the spur 123 rides around on the lip 105.

In order to close the split nut N, the thumb piece is drawn so that the spur 121 is lifted from the lip 105. The piece 121 is then turned until the spur may drop into the portion 125 of said slot (see Fig. 11). This permits the head 117 to be pushed to the left whereby the nut N is closed (the piece 121 sliding into the slot 111 but not passing entirely through). The nut N may now be rotated to operate the screw 15 and the thumb piece 121 with the head 117 is always protruding from the plate 107, ready for manipulation. The spring 119 is joined to the head 117 and the piece 121. As this piece 121 moves around the screw 15, the plate 107 is rotated freely. The advantage of the modified form is that the thumb piece 121 and head 117, for manipulating the split nut N, are always available to be operated without first turning the handle 39. Proper changes in dimensions are made to accommodate the action of the modified parts.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A slack puller comprising a frame, a housing joined thereto, a screw passing longitudinally and slidably through the housing, means for preventing rotation of the screw, a split nut mounted within the housing adapted when in closed position to cooperate with the screw and with walls in the housing to be held shut, means associated with said housing adapted to open the nut upon longitudinal movement thereof, and means for rotating said nut.

2. A slack puller comprising a frame, a housing joined thereto, a screw passing longitudinally and slidably through the housing, means for preventing rotation of the screw, a split nut mounted within the housing adapted when in closed position to cooperate with the screw and with walls in the housing to be held shut, means for drawing said nut open when moved longitudinally in one direction with respect to the housing, means for closing said nut to cooperate with the screw when moved in the opposite direction, means for positively holding the nut shut after having been moved in said last-named direction and means for rotating said nut when in its closed position.

3. A slack puller comprising a frame, a housing joined thereto, a screw passing longitudinally and slidably through the housing, means for preventing rotation of the screw, a split nut mounted within the housing adapted when in closed position to cooperate with the screw and with walls in the housing to be held shut, camming surfaces associated with the housing adapted to cooperate with camming surfaces on the nut to open and close the nut when it is moved longitudinally, and means for positively holding the nut in its open or closed position.

4. A slack puller comprising a frame, a housing joined thereto, a screw passing longitudinally and slidably through the housing, means for preventing rotation of the screw, a split nut mounted within the housing adapted when in closed position to cooperate with the screw and with walls in the housing to be held shut, camming surfaces associated with the housing adapted to cooperate with camming surfaces on the nut to open and close the nut when it is moved longitudinally, means for positively holding the nut in its open or closed position and means for driving the nut to rotate when it is closed.

5. A slack puller comprising a frame, a housing joined thereto, a screw passing longitudinally and slidably through the housing, means for preventing rotation of the screw, a split nut mounted within the housing adapted when in closed position to cooperate with the screw and with walls in the housing to be held shut, means for drawing said nut open when moved longitudinally in one direction with respect to the housing, means for closing said nut to cooperate with the screw when moved in the opposite direction, means for positively holding the nut shut after having been moved in said last-named direction, means for rotating said nut when in its closed position and driving keys associated with said means for rotating the nut adapted to slidably cooperate with recesses in said nut.

In testimony whereof, I have signed my name to this specification this 9th day of September, 1926.

THEODORE BIRKENMAIER.